(12) United States Patent
Arcidiacono et al.

(10) Patent No.: US 10,616,645 B2
(45) Date of Patent: Apr. 7, 2020

(54) METHOD FOR FILTERING A MULTIMEDIA CATALOGUE RECEIVED BY SATELLITE LINK AND FILTERING DEVICE

(71) Applicant: EUTELSAT S A, Paris (FR)

(72) Inventors: Antonio Arcidiacono, Paris (FR); Daniele Vito Finocchiaro, Paris (FR); Sébastien Grazzini, Issy-les-Moulineaux (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 15/745,258

(22) PCT Filed: Jul. 15, 2016

(86) PCT No.: PCT/EP2016/066897
§ 371 (c)(1),
(2) Date: Jan. 16, 2018

(87) PCT Pub. No.: WO2017/013013
PCT Pub. Date: Jan. 26, 2017

(65) Prior Publication Data
US 2019/0007737 A1    Jan. 3, 2019

(30) Foreign Application Priority Data

Jul. 17, 2015    (FR) .................................... 15 56799

(51) Int. Cl.
| | | |
|---|---|---|
| *H04N 7/10* | (2006.01) | |
| *H04N 7/025* | (2006.01) | |
| *H04N 7/173* | (2011.01) | |
| *H04N 21/454* | (2011.01) | |

(Continued)

(52) U.S. Cl.
CPC ..... *H04N 21/454* (2013.01); *H04N 21/25891* (2013.01); *H04N 21/2668* (2013.01);
(Continued)

(58) Field of Classification Search
CPC ............ H04N 21/454; H04N 21/4335; H04N 21/4532; H04N 21/458; H04N 21/47202;
(Continued)

(56) References Cited

U.S. PATENT DOCUMENTS

2003/0236908 A1    12/2003 Khang
2004/0117269 A1    6/2004  Karaoguz et al.
(Continued)

FOREIGN PATENT DOCUMENTS

WO    WO 97/50250 A1    12/1997

OTHER PUBLICATIONS

International Search Report as issued in International Patent Application No. PCT/EP2016/066897, dated Sep. 23, 2016.

*Primary Examiner* — Kyu Chae
(74) *Attorney, Agent, or Firm* — Pillsbury Winthrop Shaw Pittman, LLP

(57) ABSTRACT

A method for filtering a set of contents broadcast over a satellite link includes: a first reception of a user filter by at least one piece of user equipment, the user filter including a user identifier and a first list of multimedia contents, the first list being selected from a catalogue of multimedia contents that is available on a remote data server; a second reception of a set of multimedia contents of the catalogue by at least one piece of user equipment; filtering the contents by the piece of user equipment broadcast by the satellite depending on the user filter; storing the received and filtered contents in a memory of the piece of user equipment.

3 Claims, 2 Drawing Sheets

(51) Int. Cl.
  *H04N 21/45* (2011.01)
  *H04N 21/458* (2011.01)
  *H04N 21/472* (2011.01)
  *H04N 21/258* (2011.01)
  *H04N 21/2668* (2011.01)
  *H04N 21/4335* (2011.01)
  *H04N 21/475* (2011.01)
  *H04N 21/61* (2011.01)

(52) U.S. Cl.
  CPC ....... *H04N 21/4335* (2013.01); *H04N 21/458* (2013.01); *H04N 21/4532* (2013.01); *H04N 21/4755* (2013.01); *H04N 21/4756* (2013.01); *H04N 21/47202* (2013.01); *H04N 21/6143* (2013.01)

(58) Field of Classification Search
  CPC ........... H04N 21/4755; H04N 21/4756; H04N 21/6143
  See application file for complete search history.

(56) References Cited

U.S. PATENT DOCUMENTS

| | | | |
|---|---|---|---|
| 2004/0117837 A1 | 6/2004 | Karaoguz et al. | |
| 2006/0045106 A1* | 3/2006 | Lee | H04L 12/46 370/401 |
| 2008/0313685 A1* | 12/2008 | Rajakarunanayake | H04N 7/17318 725/98 |
| 2010/0333137 A1 | 12/2010 | Hamano et al. | |
| 2011/0072471 A1* | 3/2011 | Battas | H04N 5/44 725/67 |
| 2011/0214154 A1 | 9/2011 | Nagano | |
| 2011/0268010 A1* | 11/2011 | Yamada | H04B 7/15557 370/312 |
| 2012/0014254 A1* | 1/2012 | Todd | H04L 29/06027 370/235 |
| 2012/0020647 A1* | 1/2012 | Vogel | H04N 5/765 386/251 |
| 2012/0301117 A1* | 11/2012 | Alder | H04N 5/44543 386/293 |
| 2013/0212618 A1* | 8/2013 | Schultz | H04N 21/482 725/30 |
| 2014/0130068 A1 | 5/2014 | Patterson et al. | |
| 2015/0095948 A1* | 4/2015 | Kummer | H04N 21/6143 725/35 |
| 2016/0066035 A1* | 3/2016 | Chesluk | H04N 21/4532 725/109 |
| 2017/0026712 A1* | 1/2017 | Gonder | H04L 65/605 |
| 2017/0208258 A1* | 7/2017 | Itakura | H04N 21/236 |
| 2018/0352295 A1* | 12/2018 | Deshpande | H04N 21/44222 |

* cited by examiner

METHOD FOR FILTERING A MULTIMEDIA CATALOGUE RECEIVED BY SATELLITE LINK AND FILTERING DEVICE

CROSS-REFERENCE TO RELATED APPLICATIONS

This is the U.S. National Stage of PCT/EP2016/066897, filed Jul. 15, 2016, which in turn claims priority to French Patent Application No. 1556799, filed Jul. 17, 2015, the entire contents of all applications are incorporated herein by reference in their entireties.

FIELD

The field of the invention concerns methods for managing the broadcast of multimedia contents, and in particular video content, through a data network comprising at least one broadcast by satellite. More specifically, the invention relates to methods for broadcast of multimedia contents, and filtering and storage in the user's machine, comprising a method for recommending contents.

STATE OF THE ART

There are currently many methods enabling video on demand to be broadcast.

The most widespread means is broadcast of a video content which is broadcast over the Internet network using, for example, a CDN network. Such a network comprises different servers enabling the content to be broadcast to the users to be relayed. This broadcast is generally made using a unicast protocol, i.e. a point-to-point network connection. Using this means each user receives "their" content independently of the other users.

A problem of broadcasting a multimedia content using a unicast protocol is that the network can rapidly become saturated by the number of demands, and due to the volume of data exchanged. A directly related problem is that quality of service is not always guaranteed for a user. As an example, download times of multimedia contents can increase, which increases the wait period for the multimedia content to be provided. In addition, the quality of the contents, in particular due to compression, is sometimes degraded in order that a minimum service is nonetheless provided. Finally, the availability of the content can be limited, depending on the number of demands and the download time. In countries or regions where the terrestrial infrastructure is not very developed, broadcast of contents using unicast protocol can even be impossible.

A second means consists in broadcasting a video content by satellite to multiple users. The multicast protocol generally enables a content to be broadcast from one point to a plurality of points of a network. The problem is that the satellite channel is generally used to broadcast one content to a plurality of users, at the same time. This type of operation does not enable a "video on demand" type service to be provided adequately.

With regard to video on demand applications, a single user usually accesses a particular content at a given time, after a request is received. Their demand is dissociated from those of thousands of other users. If the content is available, and if the bandwidth, via the satellite transponders, is not saturated then the content can be broadcast to the user. Conversely, this system has limitations when many demands are made at the same time, and when the requested contents are different. In addition, the cost of the satellite band used can be high, and therefore not compatible with a commercial service.

A satellite link can currently be used to broadcast video content to a set of users. This content can be recorded on a disk for later viewing; this solution is more commonly called "Push VOD".

However, due to the limited size of the disk, this system cannot respond to very diverse demands by multiple users, with expectations of different kinds in respect of the choice of broadcast content. In order for each user to find the content which interests them in the disk, filtering techniques must be developed enabling to the "best" content to be stored to be defined. Some of these solutions are described in the following patent applications: WO1997050250A1 or US20030236908. However, the filtering quality is not optimal, and this is an obstacle to real use of video on demand solutions by satellite.

Application of video on demand is currently limited when it is: either distributed by the terrestrial Internet network, or broadcast by satellite channel.

SUMMARY OF THE INVENTION

The invention enables the above-mentioned disadvantages to be resolved, improving the experience of a user of a Push VOD service by satellite to such an extent that it becomes as close as possible to the experience of a real VOD service on an unsaturated network.

One object of the invention relates to a method for filtering a set of contents broadcast by a satellite link. The method comprises:

A first reception of a user filter by at least one user device, where the said user filter comprises a user identification and a first list of multimedia contents, where the first list is selected from a catalogue of multimedia contents available on a remote data server;

A second reception of a set of multimedia contents from the catalogue by at least one user device;

Filtering of contents by the user device broadcast by the satellite applying the user filter;

Storage of the said received and filtered contents in a memory of the user device.

One advantage of the method of the invention is to optimise access of a portion of a media catalogue available on a remote server, and transmitted by a satellite link to multiple users, on the basis of an existing catalogue and of filters specific to each user. Each user is thus able to view the media catalogue, and to choose a media item to view. The purpose of the invention is to maximise the probability that the media item is already stored by the user device using the method of the invention.

According to one embodiment, the filtering method comprises, at an earlier stage, determination of at least one user filter produced by a remote computation unit.

One advantage of the invention is that user filters are determined by a remote unit which computes similarities between different user filters, so as to forecast a list of media items of a catalogue for each user.

According to one embodiment, the user filter is determined according to a user profile previously transmitted from the user device to the remote computation unit.

One advantage is that data of a user profile is taken into account, and correlated with data from a set of user profiles, in order to compute indicators of similarity, and to optimise the list of media items which will be stored by the user device.

According to one embodiment, the user profile comprises at least one of the following parameters:
User data comprising:
choices predefined by a user corresponding to contents wishes;
requests for content made via a search interface;
Data relating to the user's viewing of multimedia contents;
Data relating to other users' viewing of multimedia contents;

According to one embodiment, a function to collect user data is created, to define the user profile in the user device, where the said data comprises a least one of these data elements, or a combination of them:
Title of a media;
Type of media item chosen from: {music, short video, film, documentary, series, games};
Viewing time;
Viewing duration;
Type of media broadcast method, from: {live broadcast, broadcast on demand}
Partial or complete viewing of the media item;
Rating given by a user to a media item;
Declared age of a user;
Geographical position of the user;
Data of content viewed over a given period from: {director, actor, producer, media genre}.

According to one embodiment:
the user profile is periodically calculated by computation means in the user device, and is periodically transmitted to the remote computation unit;
the user filter is periodically calculated by the remote computation unit from the user profile, and from the catalogue of broadcast multimedia content.

According to one embodiment, a transmission means establishes a connection by satellite channel, and comprises means to determine whether a unicast or multicast transmission protocol is to be used, on the basis of the data to be transmitted, where the first reception is established by a unicast protocol, and the second reception is established by means of a multicast protocol.

According to one embodiment, the first and second transmissions are made periodically with a respective period.

According to one embodiment, the remote computation unit comprises a memory to store the user profiles received from a plurality of user devices, and the user filters generated from the said user profiles and from the catalogue.

According to one embodiment, the remote computation unit makes comparisons between at least one given user profile and a set of user profiles, and generates match data, where a given user filter is generated according to the match data and the given user profile.

According to one embodiment, the remote computation unit generates a priority index for each content in the first list, using the match data.

Another object of the invention relates to a device for filtering a set of multimedia contents, comprising:
At least one decoder component, decoding IP frames of a signal received by the said filtering device;
an IP switch, switching frames with a VOD IP protocol to a filtering component, and switching multicast IP frames to a converter;
the filtering component which filters each multimedia content received, using a user filter which is updated and saved in a memory of the filtering device, where the said filtered content is:
either recorded in a memory of the said filtering device;
or transmitted to an output interface to save the filtered content on an external disk.

According to one embodiment, the filtering component makes:
a comparison of a value of a priority index of a content with a threshold priority value, in order to automatically record or delete the said content and/or;
a comparison of a date value of a content which is already recorded in a memory or a hard disk with a date threshold value, so as to automatically retain or delete the said content.

According to one embodiment, the filtering device comprises a second input connector enabling modulated signals to be received, where the said second input connector is connected to a demodulator forming part of the filtering device, and the demodulator processes the demodulated data to filter the IP frames and deliver them to the IP switch.

According to one embodiment, the IP switch switches IP frames received from the demodulator to the Ethernet port.

According to one embodiment, the filtering device comprises a first input connector enabling demodulated signals to be received, comprising a sequence of received data, where the said data is transmitted to the decoding decoder component.

According to one embodiment, the first input connector enables signals comprising IP frames to be transmitted to an outside signal modulator.

According to one embodiment, the decoder component comprises a power supply to power the IP switch, the filtering component and the converter.

According to one embodiment, the converter converts the multicast IP frames received as unicast IP frames, where the said unicast IP frames have a new addressing and are transmitted to an Ethernet port of the filtering device.

BRIEF DESCRIPTION OF THE FIGURES

Other characteristics and advantages of the invention will be seen clearly on reading the detailed description below, with reference to the appended figures, which illustrate.

DESCRIPTION

Transmission System by Satellite Channel

Figure 1:
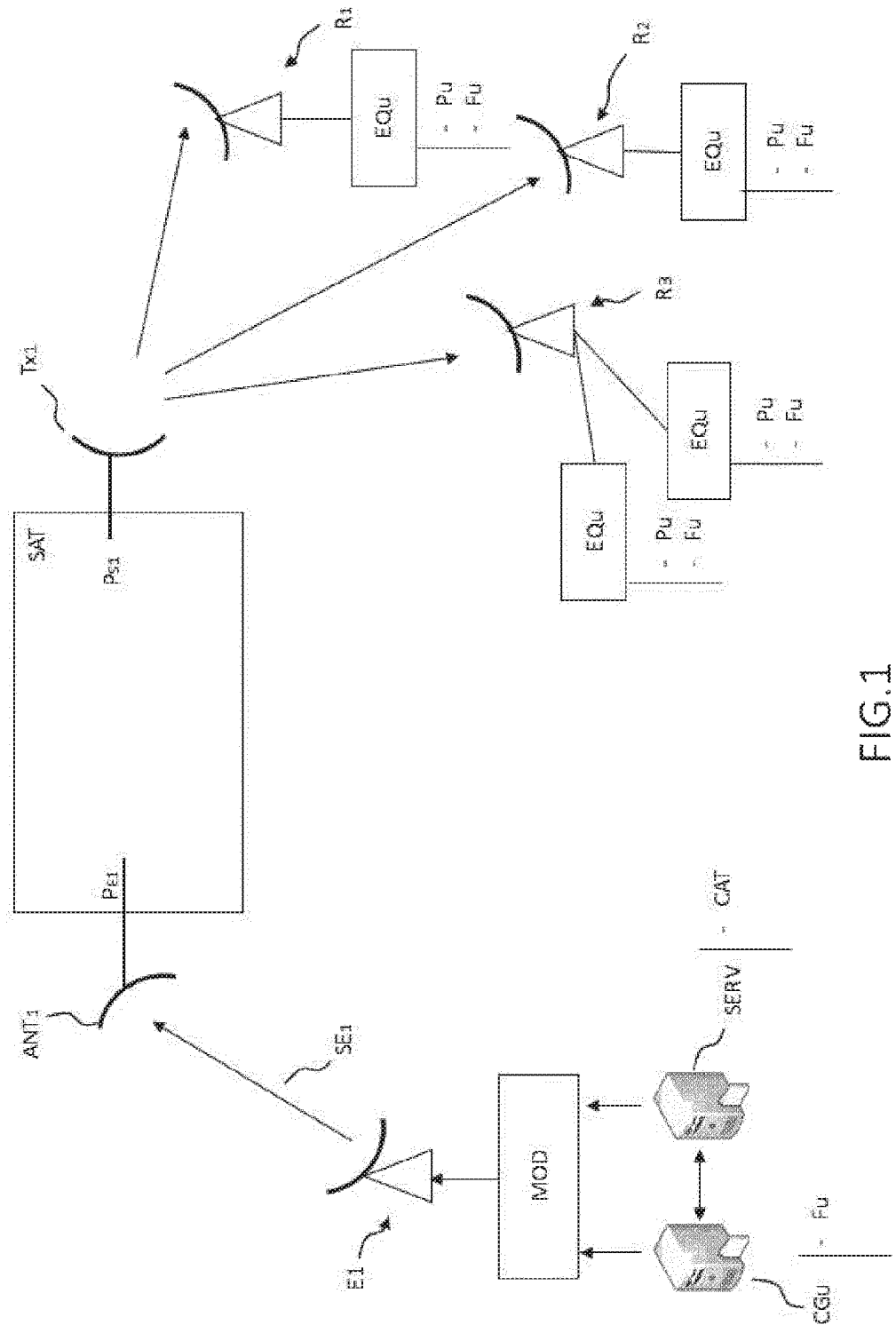
FIG. 1: a satellite broadcast system comprising a device of the invention to broadcast a set of multimedia contents.

FIG. 1 represents a remote data server SERV comprising a catalogue CAT of multimedia contents. Catalogue CAT can, for example, comprise a set of films compressed using a digital compression format.

Server SERV is connected to a transmitter $E_1$ enabling to data to be transmitted to a satellite SAT:
either directly, i.e. locally to transmitter $E_1$;
or indirectly, via a terrestrial network, for example via the Internet network, where transmitter $E_1$ is connected to the terrestrial network.

According to a variant embodiment, a plurality of servers comprises all or part of catalogue CAT, where the files of catalogue CAT can be distributed over different data servers. In this case a central supervision server comprises a management component whereby the access channels to the other servers can be known, and access to the content to be distributed by satellite channel can be obtained.

Another server comprises a user management component $CG_U$. This component enables all the user filters to be computed, which will be then transmitted to each user device $EQ_U$. Each user management component $CG_U$ is able to interrogate server SERV comprising catalogue CAT of media items in order to update, in particular, the lists of media items $L_{1u}$ indicated in each user filter $F_u$.

Transmission antenna $E_1$ comprises the components required to transmit data frames using at least one transmission frequency to a satellite SAT. To this end, the transmission antenna of transmitter $E_1$ is associated with a modulator MOD, which enables the data to be transmitted over a transmission channel with a predefined bandwidth to be modulated. A signal $SE_1$ is then transmitted to satellite SAT. Satellite SAT comprises channels conveying the received signal to a broadcast antenna $Tx_1$. The rerouted, broadcast signal is processed, for example, when it is retransmitted at another frequency than the central frequency of the received signal. The signal processed in the satellite is also filtered and amplified.

The data is then broadcast to a region comprising a set of receivers $R_1$, $R_2$, $R_3$. Each receiver $R_1$, $R_2$, $R_3$ is associated with at least one user device, marked $EQ_U$. Receivers $R_1$, $R_2$, $R_3$ are able to receive a signal transmitted by antenna Tx1 of satellite SAT in a broadcast channel.

A receiver can be associated with several user devices $EQ_U$, as represented with receiver $R_3$. This can be the case when a receiver is used for a building or an infrastructure serving different user devices $EQ_U$.

Each receiver $R_1$, $R_2$, $R_3$ receives and demodulates the received signal, and transmits the data to user devices $EQ_U$.

Figure 2:
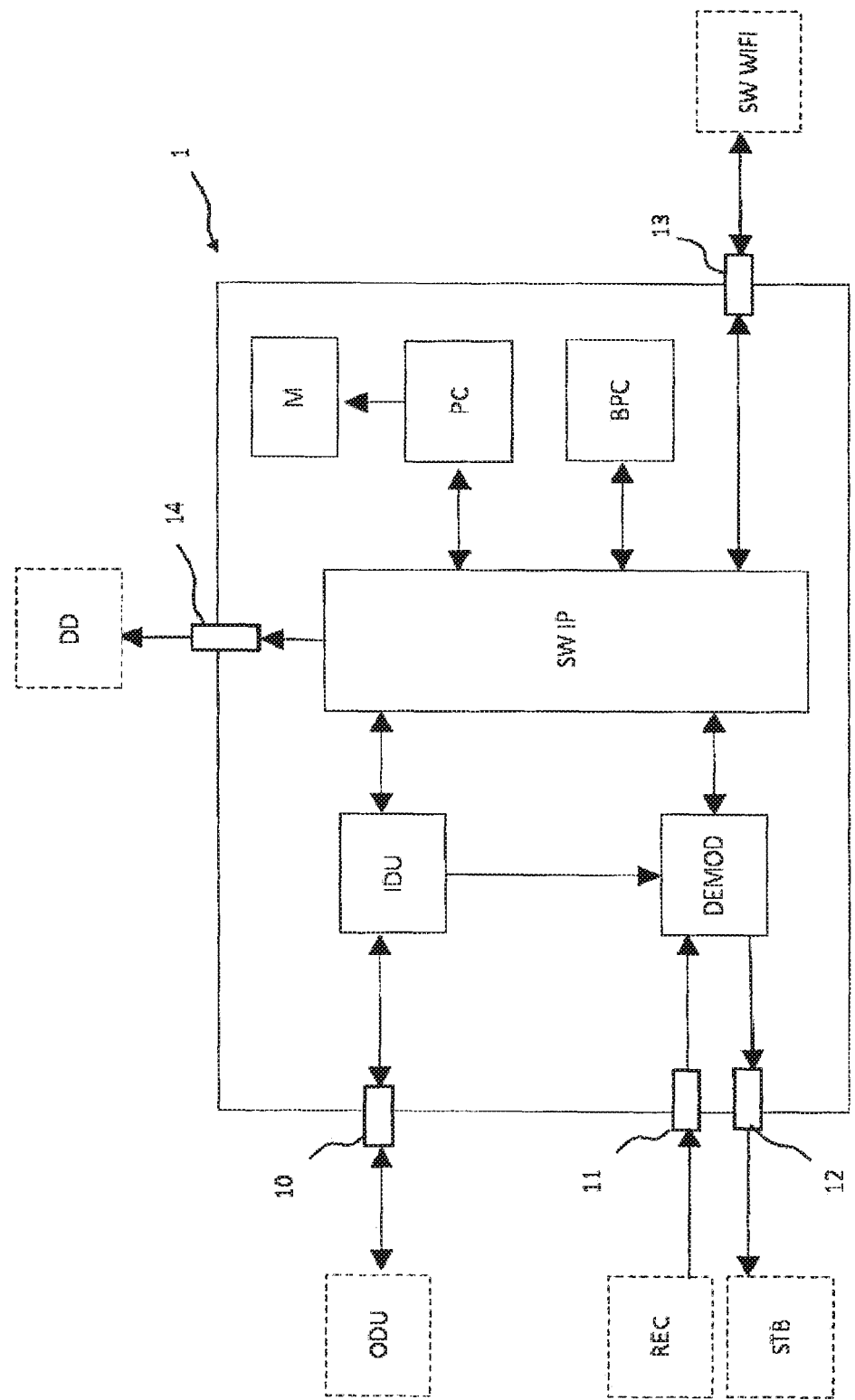
FIG. 2: a filtering device of the invention and main components for its implementation.

FIG. 2 represents a filtering device 1 of the invention which is intended to be present in a user device $EQ_U$.

One of the problems which the invention resolves consists in determining a filtering method which enables the broadcast band and the availability of the media items desired by a user to be optimised. In the context of the invention, the transmitted data is multimedia data in response to a video on demand requirement. The broadcast data is comprised in a catalogue CAT made available to a user subscribing to a service.

All or part of a catalogue CAT should be delivered by satellite. This catalogue CAT comprises contents which will be filtered by each user device $EQ_U$ using an appropriate user filter $F_u$, which is updated. Contents with a high probability of being viewed by a user from a full catalogue will be recorded by user device $EQ_U$ on a disk or in another memory, making viewing at a later time easier.

The method of the invention comprises steps enabling a selection of a catalogue to be filtered according to criteria determined according to a user profile and social data of a community of users.

The filtering method of the invention can be implemented in particular by a filtering device represented in FIG. 2.

External MODEM (ODU)

A first component, noted ODU, can be connected via an interface 10 to filtering device 1 of the invention. In one embodiment, first component ODU is a demodulator enabling the signal received from satellite SAT to be demodulated. Component ODU also transmits the demodulated data to filtering device 1.

According to one embodiment, component ODU is able to modulate data transmitted by filtering device 1 for transmission of it to satellite SAT. A return channel is then implemented. To this end, the ODU can comprise an amplifier to amplify the signal to be transmitted to satellite SAT.

According to one embodiment, the modulation of the signal received by the component ODU is compatible with transmission standard DVB-S, DVB-S2 or DVB-S2X.

According to one variant embodiment, component ODU comprises an encoder enabling the data to be transmitted to be encoded. The return link can then be made from user device $EQ_U$ to the satellite. The data transmitted by this return link can be modulated, for example by a modulation of the DVB-RCS type.

The modulation can also, for example, be a spread spectrum modulation. This modulation enables the transmission power levels to be reduced, and therefore avoids having to have a bulky high-power amplifier in the component ODU. It can then be incorporated more easily, since it is more compact.

According to one embodiment, filtering device 1 comprises an Ethernet or coaxial interface. When the interface is coaxial, it can, for example, be of the EoC type to transmit IP frames in a coaxial connector. According to one embodiment, there can be two interfaces, one coaxial and one Ethernet.

IP Decoder (IDU)

Filtering device 1 of the invention comprises a decoder component, noted IDU, decoding the frames of the IP protocol of a signal received by filtering device 1 sent from the component ODU.

The component IDU also enables IP frames to be encoded, so as to transmit them to external component ODU if there is a return link to satellite SAT.

According to one embodiment, decoder component IDU comprises a power supply to power an IP switch, a filtering component and a converter.

IP Switch

The device of the invention comprises a switch, noted SW IP. This switch enables to the IP frames to be switched to different components depending on the services sought by and contained in the headers of the IP frames.

Filtering Component PC

When the IP frames concern data from a multimedia content, the packets received by the IP switch are directed to the filtering component PC. The filtering component PC then takes a decision concerning the nature of the received frames in order to process the data. In particular, the filtering component PC compares the data of the received IP frames with a user filter $F_u$. The comparison can also be made after a set of frames with an identical received multimedia content has been compiled. For example, when a set of frames relates to the same content such as a video, the comparison can be made by means of an identifier of the film or a name of a film.

When the comparison has been made, the content is: either recorded in a memory for possible viewing at a later time, or not recorded.

According to a first variant, the filtering component PC saves media items filtered by the filtering component PC in a memory M of filtering device 1 of the invention.

According to another variant, the filtered media items can be saved on an external memory DD, such as a hard disk or a solid state drive, such as a flash memory. In the latter case, filtering device 1 of the invention comprises an interface 14 enabling an external hard disk DD or a USB to be connected. Such an interface can be of the USB type or any other interface allowing data to be transferred.

The filtering component PC therefore comprises a user filter $F_u$ enabling to the received media items to be discriminated:
media items desired by a user when the latter makes a given request or;

media items which will probably be viewed by a user, since the said probability is higher than a predefined threshold.

To calculate the probability of a media item being of interest for a given user, a remote computation entity enables calculations to be made between a user profile $P_u$ and social data, to generate user filter $F_u$. User filter $F_u$ will then be transmitted and dedicated to a given user device $EQ_U$.

Converter Component BPC

When the frames comprise multicast protocol headers, switch SW IP directs these frames to a converter noted BPC. Converter BPC enables the multicast IP frames to be converted to unicast IP frames.

A protocol or a transmission of a content to multiple users is here called a "multicast" protocol or transmission. A protocol or a transmission of a content to a single user is here called a "unicast" protocol or transmission; this is therefore an individual transmission.

One problem is that the broadcast by satellite is generally made by a multicast protocol, i.e. a given content is broadcast to multiple users while, increasingly, processing of the data received by satellite requires customisation adapted to the usage of each person.

This concerns in particular protection of transmitted data, the interactivity allowed by a satellite return link enabling, for example, encryption keys or certificates to be exchanged, transmission of votes, deployment of Internet protocol, or customisation of contents to be broadcast.

The converter BPC enables multicast IP frames to be converted to unicast IP frames. After this conversion has been accomplished, the converted frames can be rerouted to switch SW IP to be directed to the appropriate component, such as for example the filtering component PC.

The method of the invention also enables an entire video file to be reconstituted from received IP frames and from the added redundancy in the data frames. The added redundancy can be implemented by means of a given encoding such as, for example, an FEC encoding or a "digital fountain" algorithm. The content is then recorded on the hard disk or in a memory.

Component DEMOD (DVB S2)

The filtering device of the invention comprises, in one embodiment, a second input connector 11 enabling modulated signals to be received from a receiver REC external to filtering device 1 of the invention. A demodulation component, noted DEMOD, is able to demodulate the modulated signals received from second input connector 11. In one embodiment, input connector 11 can be a coaxial connector.

Connector 11 is advantageously intended to be connected to a receiver REC comprising an antenna for receiving a signal from a satellite SAT. Receiver REC comprises a component enabling the signal to be converted to an intermediate frequency band and the various signals to be mixed in a single coaxial interface.

In addition to demodulating the signals, demodulator DEMOD enables the demodulated data to be processed to filter the IP frames and the video frames not encapsulated in IP frames. Processing then comprises routing the decoded IP frames to switch SW IP, and routing of the video frames not encapsulated in IP frames to a video component STB. Video component STB processes the demodulated data and is able to decode the video frames to generate an image or to compile frames to form a media file.

Video component STB is also able to transmit video frames compatible with a display device in order to display them.

The IP frames decoded by the component DEMOD can be routed to an Ethernet port 13 via switch SW IP, to converter component BPC, or to the filtering component.

When switch SW IP directs the frames to an external WIFI switch SW via Ethernet port 13, the transmitted frames allow the multimedia content to be viewed on external viewing devices. Each addressed device decodes the IP frames in order to reconstruct the multimedia stream in question. Various viewing devices, such as a television, a tablet, a computer or a smartphone can be addressed by external WIFI switch SW. The latter can, for example, be a wireless switch or router.

When the IP frames sent to switch SW have a multicast protocol, as before, they are routed to component BPC for the headers of the frames to be modified in unicast mode. The frames are then retransmitted to switch SW in order to be directed to an external device accessible from wireless external WIFI switch SW via interface 13, or to the filtering component PC.

Different Configurations (DEMOD, IDU)

Filtering device 1 therefore comprises, according to one embodiment, a demodulator DEMOD and a decoder component IDU. This embodiment enables filtering device 1 to be compatible with various protocols for transmission of data broadcast by satellite SAT, and to receive a demodulated signal, or alternatively a modulated signal, in a frequency band transposed around an intermediate frequency.

According to various embodiments, filtering device 1 of the invention can comprise only demodulator DEMOD or only decoder component IDU, or both components.

Filtering Method

The invention also relates to a method for filtering a multimedia content received by satellite SAT by a user device $EQ_U$.

The filtering component PC comprises computation means, such as a computer, to execute the steps of computation and comparison, and to take the decisions relating to the processing of the received frames.

Reception of User Filter $F_u$

The method comprises the reception of a user filter Fu by a user device $EQ_U$. User filter $F_u$ can be transmitted by a satellite link or a terrestrial link, depending on the available connection of the filtering device PC.

When user filter $F_u$ is received by a terrestrial link, the IP switch is, for example, connected to a local network connected to the Internet. User filter $F_u$ is sent to a given user via the Internet network.

When user filter $F_u$ is received by a satellite link, the unicast protocol can advantageously be used to send some data to a single user.

User filter $F_u$ comprises an identification of a user $ID_U$ relating to an individual or relating to a user device $EQ_U$. User filter $F_u$ also comprises a list of multimedia contents, noted first list $L_{1u}$. List $L_{1u}$ is a subset of multimedia catalogue CAT of remote server SERV or of the various servers hosting catalogue CAT.

List $L_{1u}$ can specify a priority for the content, such that user filter $F_u$ is able to choose the content to record, taking account of the space available on the storage device (memory M or disk DD), and possibly delete content which has been recorded for a time longer than a predefined threshold, or content which has a low priority.

User Profile $P_u$

User filter $F_u$ is established by the management component using a user profile $P_u$ and a set of social data. User profile $P_u$ is established within a user device $EQ_U$.

A user profile $P_u$ can comprise different types of data.

For example, it can comprise data on the user themselves and their habits, such as, for example:

Their age;
Their geographical position, their address, their city;
Their language or origins.

In one embodiment, user profile $P_u$ can comprise a set of data which a user has entered concerning their tastes and the type of media which they like to view:

The type of preferred media from the following list: {music, short video, film, documentary, series, games}
The average number of media which they view over a predefined period;
The genre(s) of media which they prefer, for example a film genre;
Data relating to the category of a film, such as an actor, a director, a producer, or a broadcaster which a user likes.

User profile $P_u$ can also comprise data collected during previous viewings such as, for example:

The title of a media item viewed in this manner and/or a list of previously viewed media items;
Data from content viewed from all data: {director, actor, producer, media genre, media origin}.
Type of media item from: {music, video, games} viewed, and the proportion of each type of media viewed.
Viewing times;
Viewing durations;
Method of broadcast of the media item from: {live broadcast, broadcast on demand}
Whether the media was viewed in part or completely;
A rating given by a user to a media item.

This data enables a user profile $P_u$ to be produced which can be modified over time in accordance with the history of the viewed media items.

Transmission of a user profile $P_u$ can be scheduled, and it can be transmitted at regular periods and at predefined times over time to the user management component.

User Management Component ($CG_U$)

A user management component $CG_U$ is represented in FIG. 1. It comprises a remote computation unit which enables all the user filters $\{F_u\}_{i \in [1, N]}$ to be computed as a function of preconfigured parameters, which can change over time. User management component $CG_U$ transmits to a set of users, and therefore to a set of user devices $EQ_U$ all user filters $\{F_u\}_{\epsilon [1, N]}$, where each user filter $F_u$ has been computed for each individual of a given population. In particular, user filters $F_u$ are processed and routed to user device $EQ_U$ and therefore to filtering device 1 of the invention in order to be saved until a new user filter $F_u$ is received to replace it.

According to one embodiment, catalogue CAT and user management component $CG_U$ are on the same server SERV. In another embodiment, two servers each perform respectively the functions of computation of the user filters and of hosting of catalogue CAT.

According to one embodiment, the management component can be configured on remote server SERV comprising catalogue CAT. According to another embodiment, the management component is configured on another computer or another server accessing the list of media items in catalogue CAT hosted on remote server SERV.

Each list $L_{1U}$ can be regularly updated if it changes over time, and transmitted to each filtering device 1. List $L_{1U}$ is dynamic, since it is regularly updated to take account of parameters which change over time.

The criteria for updating a list $L_{1u}$ depend on changes of the user profile and of social data.

Social data comprises viewing data and data of profiles of other users who have matches with a given user.

As an example, if a set of users has viewed the same set of media items, a portion of this same set of media items will be suggested in a list of a given user who has not viewed the media items of this portion but has also viewed some of the media items in this set.

Various algorithms can be proposed and implemented by user management component $CG_U$ to generate new media items in a user list $L_{1u}$ of a given user filter $F_u$. The algorithms used can take into account:

the age and/or gender data of a set of users,
geographical data, such as a residential area of a set of users,
similarities of tastes defined in user profile $P_U$;
similarities in terms of viewing of a set of media items over given periods, defining affinities of tastes between different users.

User filter $F_u$ is thus regularly updated as new user data concerning their viewing and changes to their user profile $P_u$ is received.

Broadcast of the Catalogue

According to one embodiment, transmitter E1 via the transmission antenna associated with remote server SERV regularly transmits a film catalogue to a set of users in an area covered by transmission antenna $T_{x1}$ of satellite SAT. For example, catalogue CAT is transmitted in packets or subsets, as scheduled over a predefined duration.

Catalogue CAT comprises hundreds, or possibly thousands, of media items. These media items comprise, for example, films, documentaries, games, music files or other multimedia contents. These media items are transmitted by satellite channel, broadcasting the files in question at times of day or night in terrestrial regions covered by antenna $T_{x1}$.

Each user device $EQ_U$ defining or comprising filtering device 1 of the invention comprises means to receive the files of multimedia catalogue CAT. The method of the invention therefore comprises a step of reception of the files of catalogue CAT or of a portion of the catalogue, for example by using a protocol of the "push" or "datacast" type, which can reconstitute a file from fragments, possibly applying error-correction algorithms.

Depending on the configuration of user device $EQ_U$, reception by satellite channel can take place:

either over the channel of the IDU via the ODU;
or over the channel of demodulator DEMOD via a receiver configured to receive signals from a broadcast satellite SAT and to demodulate the said received signals.

Application of User Filter $F_u$ and Storage

The method of the invention comprises a step of filtering of the received media items, according to user filter $F_u$ recorded in user device $EQ_U$. User filter Fu was received by user device $EQ_U$ and was saved in a prior step. When a media item is present in user filter $F_u$, it is then recorded in a memory M or DD after filtering. If the space available in memory M or DD is not sufficient, filter $F_u$ uses the priority of the media items to potentially delete low-priority content to make space for higher-priority content. When a received media item is not present in user filter $F_u$, or when the space is fully occupied by higher-priority media items, then it is not recorded in a memory M or DD after filtering.

Internal memory M or external memory DD of filtering device 1, as applicable, comprises a list of media items corresponding to list $L_{1u}$ of user profile $F_u$.

One advantage of saving a portion of catalogue CAT is to enable a user to be given immediate access to a portion of catalogue CAT which is directly stored in an internal or external memory of user device $EQ_U$. When viewing a media item stored in a memory M or DD, viewing cannot be affected by any disturbance.

And it will be noted that, in general, when viewing a film using streaming, disturbances can occur due to network overload, when the network is terrestrial, or due to limitation of bandwidth, when the link is a satellite link. In the case of a satellite link, other disadvantages can degrade the viewing quality of the film, such as poor meteorological conditions.

The method of the invention is therefore of interest to maintain a level of viewing quality for a user with a user device which implements the method of the invention.

One advantage of the use of an algorithm based on user profile $P_u$ and on all the viewing data of the other users is that it can optimise the probability that a content which is already stored by a user will be viewed, and therefore potentially eliminates the step of on-demand downloading of a given media item. Indeed, on-demand downloading of a given media item by a given user at a given period requires much greater network and bandwidth resources then when the media item is broadcast once for a set of users, with the possibility of saving this content if the probability of its being viewed is high.

Another advantage of this invention is that it limits the storage requirements on the user's machine. Indeed, due to the advanced algorithms which are used to produce lists $L_{1u}$ from profiles $P_u$ of all the users, the disk or memory used can be quite small, even if catalogue CAT is very large. This then reduces the cost of the equipment for the user of this video on demand service.

The invention claimed is:

1. A device for filtering a set of multimedia contents, comprising:
    at least one decoder component, decoding internet protocol (IP) frames of a signal received by the filtering device;
    an IP switch, switching frames with a video on demand (VOD) IP protocol to a filtering component, and switching multicast IP frames to a converter;
    the filtering component configured to filter each multimedia content received, using a user filter which is updated and saved in a memory of the filtering device, wherein the filtered content is:
    either recorded in a memory of the filtering device;
    or transmitted to an output interface to save the filtered content on an external disk;
    a second input connector enabling modulated signals to be received, wherein the second input connector is connected to a demodulator forming part of the filtering device, and
    the demodulator is configured to process the demodulated data to filter the IP frames and deliver them to the IP switch.

2. The filtering device according to claim 1, wherein the filtering component is configured to make:
    a comparison of a value of a priority index of a content with a threshold priority value, in order to automatically record or delete the content and/or;
    a comparison of a date value of a content which is already recorded in a memory or a hard disk with a date threshold value, so as to automatically retain or delete the content.

3. The filtering device according to claim 1, wherein the IP switch is configured to switch IP frames received from a demodulator to an Ethernet port.

* * * * *